(12) United States Patent
Chao et al.

(10) Patent No.: US 10,904,514 B2
(45) Date of Patent: *Jan. 26, 2021

(54) POLARIZATION ILLUMINATION USING ACOUSTO-OPTIC STRUCTURED LIGHT IN 3D DEPTH SENSING

(71) Applicant: Facebook Technologies, LLC, Menlo Park, CA (US)

(72) Inventors: Qing Chao, Redmond, WA (US); Michael Hall, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 759 days.

This patent is subject to a terminal disclaimer.

(21) Appl. No.: 15/428,780

(22) Filed: Feb. 9, 2017

(65) Prior Publication Data

US 2018/0227567 A1 Aug. 9, 2018

(51) Int. Cl.
*G01C 3/08* (2006.01)
*H04N 13/254* (2018.01)
(Continued)

(52) U.S. Cl.
CPC ....... *H04N 13/254* (2018.05); *G01B 11/2513* (2013.01); *G01S 3/00* (2013.01);
(Continued)

(58) Field of Classification Search
CPC ...... H04N 13/254; H04N 5/33; H04N 13/337; G01S 17/86; G01S 3/00; G01S 7/499; G01S 17/46; G01S 17/89; G01B 11/2513
See application file for complete search history.

(56) References Cited

U.S. PATENT DOCUMENTS

| 4,770,530 A | 9/1988 | Van Aken et al. |
| 6,208,466 B1 * | 3/2001 | Liu .................. G02B 5/1861 359/584 |

(Continued)

FOREIGN PATENT DOCUMENTS

| CN | 107250882 A | 10/2017 |
| CN | 107850780 A | 3/2018 |

(Continued)

OTHER PUBLICATIONS

Cheng, H. H. et al., "Concept for a Transmissive, Large Angle, Light Steering Device with High Efficiency," Optics Letters, May 1, 2015, pp. 2080-2083, vol. 40, No. 9.

(Continued)

*Primary Examiner* — Samantha K Abraham
(74) *Attorney, Agent, or Firm* — Fenwick & West LLP

(57) ABSTRACT

A depth camera assembly (DCA) includes a polarized structured light generator, an imaging device and a controller. The structured light generator illuminates a local area with one or more polarized structured light patterns in accordance with emission instructions from the controller. The structured light generator comprises an illumination source, an acousto-optic device, and a polarizing element. The acousto-optic device generates a structured light pattern from an optical beam emitted from the illumination source. The polarizing element generates the one or more polarized structured light patterns using the structured light pattern. The imaging device captures portions of the one or more polarized structured light patterns scattered or reflected from the local area. The controller determines depth information, degree of polarization and index of refraction map for the local area based at least in part on the captured portions of the one or more scattered or reflected polarized structured light patterns.

23 Claims, 7 Drawing Sheets

US 10,904,514 B2

Page 2

(51) Int. Cl.
*H04N 13/337* (2018.01)
*G01S 3/00* (2006.01)
*H04N 5/33* (2006.01)
*G01B 11/25* (2006.01)
*G01S 7/499* (2006.01)
*G01S 17/46* (2006.01)
*G01S 17/89* (2020.01)
*G01S 17/86* (2020.01)

(52) U.S. Cl.
CPC .............. *G01S 7/499* (2013.01); *G01S 17/46* (2013.01); *G01S 17/86* (2020.01); *G01S 17/89* (2013.01); *H04N 5/33* (2013.01); *H04N 13/337* (2018.05)

(56) References Cited

U.S. PATENT DOCUMENTS

| | | | |
|---|---|---|---|
| 8,320,621 | B2 | 11/2012 | McEldowney |
| 9,294,758 | B2* | 3/2016 | Xiong ..................... G06T 7/55 |
| 9,804,397 | B2 | 10/2017 | Schowengerdt et al. |
| 9,946,071 | B2* | 4/2018 | Schowengerdt ......... G02B 6/32 |
| 10,027,386 | B2 | 7/2018 | Kohli |
| 10,158,845 | B2 | 12/2018 | Zhu et al. |
| 10,168,454 | B2 | 1/2019 | Sugihara et al. |
| 10,181,200 | B1 | 1/2019 | Chao et al. |
| 10,388,026 | B1 | 8/2019 | Chao et al. |
| 10,410,373 | B1 | 9/2019 | Hall et al. |
| 10,412,371 | B1 | 9/2019 | Chao et al. |
| 10,503,265 | B2 | 12/2019 | Viswanathan |
| 2003/0012657 | A1* | 1/2003 | Marr ..................... G02F 1/0147 417/48 |
| 2004/0108971 | A1 | 6/2004 | Waldern et al. |
| 2004/0233408 | A1 | 11/2004 | Sievers |
| 2005/0122549 | A1 | 6/2005 | Goulanian et al. |
| 2006/0028400 | A1* | 2/2006 | Lapstun ............... H04N 13/344 345/8 |
| 2008/0236275 | A1* | 10/2008 | Breed .................. B60N 2/2806 73/290 V |
| 2008/0246952 | A1 | 10/2008 | Fenrich et al. |
| 2010/0091203 | A1* | 4/2010 | Kobayashi ............ G02F 1/135 349/12 |
| 2010/0176102 | A1 | 7/2010 | Petring et al. |
| 2010/0301023 | A1 | 12/2010 | Unrath et al. |
| 2010/0304854 | A1 | 12/2010 | McEldowney |
| 2011/0298918 | A1 | 12/2011 | McEldowney |
| 2013/0343705 | A1 | 12/2013 | Vermeulen et al. |
| 2014/0035959 | A1 | 2/2014 | Lapstun |
| 2014/0192214 | A1 | 7/2014 | Laroia |
| 2014/0293011 | A1* | 10/2014 | Lohry ................ G06K 9/00201 348/47 |
| 2014/0293737 | A1 | 10/2014 | Sangawa et al. |
| 2015/0241705 | A1 | 8/2015 | Abovitz et al. |
| 2015/0338718 | A1 | 11/2015 | Zhang et al. |
| 2016/0026253 | A1* | 1/2016 | Bradski ................ H04N 13/344 345/8 |
| 2016/0043350 | A1 | 2/2016 | Cho et al. |
| 2016/0097930 | A1 | 4/2016 | Robbins et al. |
| 2016/0135688 | A1 | 5/2016 | Ebisawa |
| 2016/0139402 | A1 | 5/2016 | Lapstun |
| 2016/0198147 | A1 | 7/2016 | Waligorski et al. |
| 2016/0249982 | A1 | 9/2016 | Varghese et al. |
| 2016/0286202 | A1* | 9/2016 | Romano ................ G01S 17/46 |
| 2016/0295201 | A1 | 10/2016 | So et al. |
| 2016/0313244 | A1 | 10/2016 | Shiono |
| 2017/0122728 | A1 | 5/2017 | Kipfer et al. |
| 2017/0195653 | A1* | 7/2017 | Trail .................... H04N 13/344 348/47 |
| 2017/0214907 | A1 | 7/2017 | Lapstun |
| 2017/0301736 | A1 | 10/2017 | Wang et al. |
| 2017/0350575 | A1* | 12/2017 | Hill .......................... G01J 3/10 |
| 2018/0061034 | A1 | 3/2018 | Zhao et al. |
| 2018/0084245 | A1 | 3/2018 | Lapstun |
| 2018/0131929 | A1 | 5/2018 | Lee et al. |
| 2018/0143438 | A1 | 5/2018 | Oh |
| 2018/0204340 | A1 | 7/2018 | Zhao et al. |
| 2018/0275410 | A1 | 9/2018 | Yeoh et al. |
| 2019/0008388 | A1 | 1/2019 | Ando et al. |
| 2019/0066316 | A1 | 2/2019 | Bardagjy et al. |
| 2019/0075281 | A1 | 3/2019 | Hall et al. |
| 2019/0086674 | A1 | 3/2019 | Sinay et al. |
| 2019/0273114 | A1 | 9/2019 | Liu |

FOREIGN PATENT DOCUMENTS

| | | | |
|---|---|---|---|
| CN | 108027881 A | 5/2018 | |
| CN | 108353115 A | 7/2018 | |
| EP | 0903609 A1 * | 3/1999 | ............. G01B 11/24 |

OTHER PUBLICATIONS

Cheng, H.H. et al., "Large Angle Image Steering Using a Liquid Crystal Device," SID International Symposium Digest of Technical Papers, Jun. 2014, pp. 739-742, vol. XLV, Book II.

Provenzano, C. et al., "Electrically Tunable Two-Dimensional Liquid Crystals Gratings Induced by Polarization Holography," Optics Express, Apr. 30, 2007, pp. 5872-5878, vol. 15, No. 9.

"Principle of Depth Sensors," Media Research Lab, Undated, 4 pages, May be Retrieved at <URL:http://homel.vsb.cz/~fus032/ano2/hct.pdf>.

"Time of Flight Sensors | Overview | Sensors | TI.com," Texas Instruments Incorporated, 1995-2018, 2 pages, [Online] [Retrieved on Jun. 28, 2018] Retrieved from the Internet<URL: http://www.ti.com/lsds/ti/sensing-products/optical-sensors/3d-time-of-flight-sensors-technology-comparison.page>.

The State Intellectual Property Office of People's Republic of China, Office Action, Chinese Patent Application No. 201811031191.2, dated Sep. 28, 2020, 10 pages.

* cited by examiner

POLARIZATION ILLUMINATION USING ACOUSTO-OPTIC STRUCTURED LIGHT IN 3D DEPTH SENSING

BACKGROUND

The present disclosure generally relates to depth sensing, and specifically relates to polarization illumination using acousto-optic structured light in three-dimensional (3D) depth sensing.

The current technique for enhancing local resolution is based on calculating surface normals from basic Fresnel equations. However, accuracy of depth sensing based on this approach is not satisfactory. State of polarization (SOP) can reveal important shape and surface normal properties, an index of refraction map and a degree of polarization map of 3D objects in a local area, which can improve local depth and spatial resolution. However, information about SOP, surface normals and other properties of light scattered or reflected from 3D objects in the local area cannot be obtained based only on intensity of light signals.

SUMMARY

A depth camera assembly (DCA) determines depth information associated with one or more objects in a local area. The DCA comprises structured light generator, an imaging device and a controller. The structured light generator is configured to illuminate a local area with one or more polarized structured light patterns in accordance with emission instructions. The structured light generator comprises an illumination source, an acousto-optic device, a polarizing element, and a projection assembly. The illumination source is configured to emit an optical beam. The acousto-optic device generates a structured light pattern from the optical beam, wherein the acousto-optic device is configured to function as a dynamic diffraction grating that diffracts the optical beam to form the structured light pattern based in part on the emission instructions. The projection assembly comprising a polarizing element that generates the one or more polarized structured light patterns using the structured light pattern. The projection assembly is configured to project the one or more polarized structured light patterns into the local area. The imaging device is configured to capture portions of the one or more polarized structured light patterns scattered or reflected from one or more objects in the local area. The controller may be coupled to both the structured light generator and the imaging device. The controller generates the emission instructions and provides the emission instructions to the structured light generator. The controller is also configured to determine depth information for the one or more objects based at least in part on polarization information of the captured portions of the one or more scattered or reflected polarized structured light patterns.

A head-mounted display (HMD) can further integrate the DCA. The HMD further includes an electronic display and an optical assembly. The HMD may be, e.g., a virtual reality (VR) system, an augmented reality (AR) system, a mixed reality (MR) system, or some combination thereof. The electronic display is configured to emit image light. The optical assembly is configured to direct the image light to an exit pupil of the HMD corresponding to a location of a user's eye, the image light comprising the depth information of the one or more objects in the local area determined by the DCA.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A depth camera assembly (DCA) for determining depth information of objects in a local area surrounding some or all of the DCA. The DCA includes a polarized structured light source, a polarization sensitive camera and a controller. The polarized structured light source generates a polarized structured light pattern that is projected into the local area. The polarization sensitive camera captures portions of the polarized structured light scattered or reflected from the objects in the local area. The controller determines depth information by calculating surface normals for the objects in the local area using the detected light, e.g., by calculating Stokes reflectance parameters. In some embodiments, the polarized structured light source includes an acousto-optic device and a polarizing element configured to generate the polarized structured light pattern.

In some embodiments, the DCA is integrated into a head-mounted display (HMD) that captures data describing depth information in a local area surrounding some or all of the HMD. The HMD may be part of, e.g., a virtual reality (VR) system, an augmented reality (AR) system, a mixed reality (MR) system, or some combination thereof. The HMD further includes an electronic display and an optical assembly. The electronic display is configured to emit image light. The optical assembly is configured to direct the image light to an exit pupil of the HMD corresponding to a location of a user's eye, the image light comprising the depth information of the objects in the local area determined by the DCA.

Figure 1:
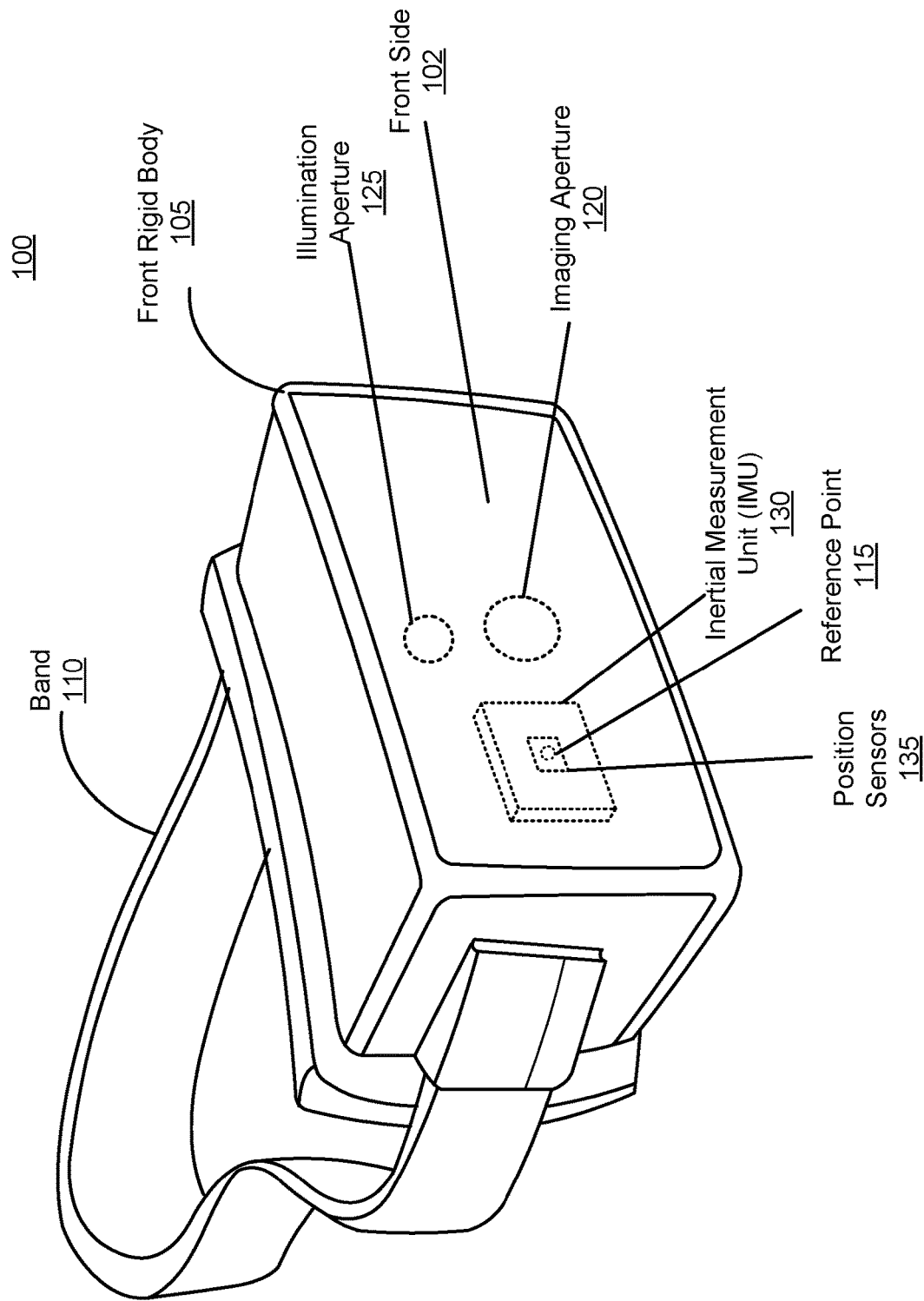
FIG. 1 is a diagram of a head-mounted display (HMD), in accordance with an embodiment.

FIG. 1 is a diagram of a HMD 100, in accordance with an embodiment. The HMD 100 may be part of, e.g., a VR system, an AR system, a MR system, or some combination thereof. In embodiments that describe AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105, a band 110, and a reference point 115. The HMD 100 also includes a DCA configured to determine depth information of a local area surrounding some or all of the HMD 100. The HMD 100 also includes an imaging aperture 120 and an illumination aperture 125, and an illumination source of the DCA emits light (e.g., structured light) through the illumination aperture 125. And an imaging device of the DCA captures light from the illumination source that is reflected/scattered from the local area through the imaging aperture 120. Light emitted from the illumination source of the DCA through the illumination aperture 125 comprises a polarized structured light pattern, as discussed in more detail in conjunction with FIGS. 2-4. Light reflected/scattered from the local area through the imaging aperture 120 and captured by the imaging device of the DCA comprises portions of the reflected/scattered polarized structured light pattern, as also discussed in more detail in conjunction with FIGS. 2-4.

The front rigid body 105 includes one or more electronic display elements (not shown in FIG. 1), one or more integrated eye tracking systems (not shown in FIG. 1), an Inertial Measurement Unit (IMU) 130, one or more position sensors 135, and the reference point 115. In the embodiment shown by FIG. 1, the position sensors 135 are located within the IMU 130, and neither the IMU 130 nor the position sensors 135 are visible to a user of the HMD 100. The IMU 130 is an electronic device that generates fast calibration data based on measurement signals received from one or more of the position sensors 135. A position sensor 135 generates one or more measurement signals in response to motion of the HMD 100. Examples of position sensors 135 include: one or more accelerometers, one or more gyroscopes, one or more magnetometers, another suitable type of sensor that detects motion, a type of sensor used for error correction of the IMU 130, or some combination thereof. The position sensors 135 may be located external to the IMU 130, internal to the IMU 130, or some combination thereof.

Figure 2:
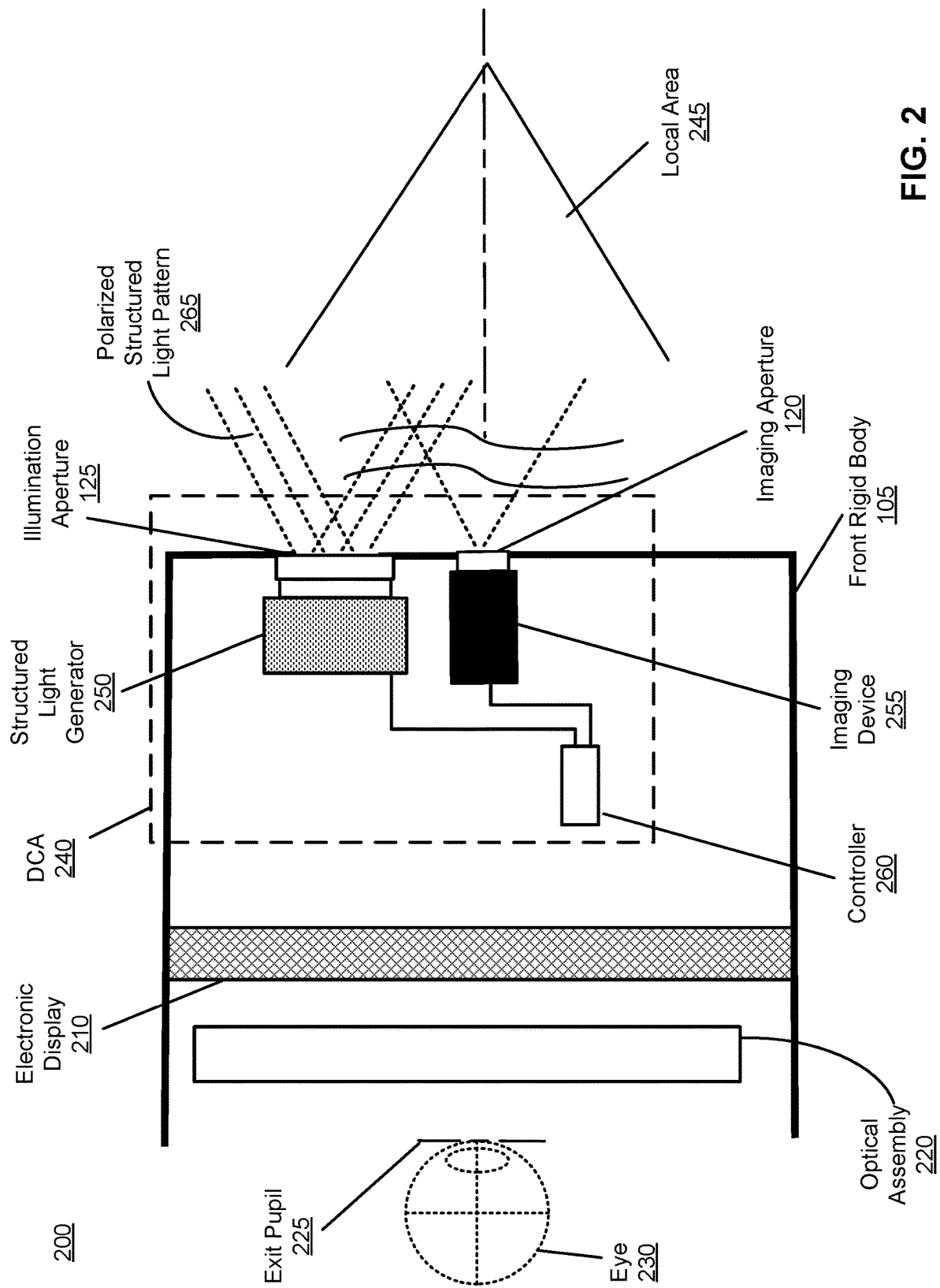
FIG. 2 is a cross section of a front rigid body of the HMD in FIG. 1, in accordance with an embodiment.

FIG. 2 is a cross section 200 of the front rigid body 105 of the HMD 100 shown in FIG. 1. As shown in FIG. 2, the front rigid body 105 includes an electronic display 210 and an optical assembly 220 that together provide image light to an exit pupil 225. The exit pupil 225 is the location of the front rigid body 105 where a user's eye 230 is positioned. For purposes of illustration, FIG. 2 shows a cross section 200 associated with a single eye 230, but another optical assembly 220, separate from the optical assembly 220, provides altered image light to another eye of the user. The front rigid body 105 also has an optical axis corresponding to a path along which image light propagates through the front rigid body 105.

The electronic display 210 generates image light. In some embodiments, the electronic display 210 includes an optical element that adjusts the focus of the generated image light. The electronic display 210 displays images to the user in accordance with data received from a console (not shown in FIG. 2). In various embodiments, the electronic display 210 may comprise a single electronic display or multiple electronic displays (e.g., a display for each eye of a user). Examples of the electronic display 210 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 210 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optical assembly 220 magnifies received light from the electronic display 210, corrects optical aberrations associated with the image light, and the corrected image light is presented to a user of the HMD 100. At least one optical element of the optical assembly 220 may be an aperture, a Fresnel lens, a refractive lens, a reflective surface, a diffractive element, a waveguide, a filter, or any other suitable optical element that affects the image light emitted from the electronic display 210. Moreover, the optical assembly 220 may include combinations of different optical elements. In some embodiments, one or more of the optical elements in the optical assembly 220 may have one or more coatings, such as anti-reflective coatings, dichroic coatings, etc. Magnification of the image light by the optical assembly 220 allows elements of the electronic display 210 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the user's field-of-view. In some embodiments, the optical assembly 220 is designed so its effective focal length is larger than the spacing to the electronic display 210, which magnifies the image light projected by the electronic display 210. Additionally, in some embodiments, the amount of magnification may be adjusted by adding or removing optical elements.

As shown in FIG. 2, the front rigid body 105 further includes a DCA 240 for determining depth information of one or more objects in a local area 245 surrounding some or all of the HMD 100. The DCA 240 includes a structured light generator 250, an imaging device 255, and a controller 260 that may be coupled to both the structured light generator 250 and the imaging device 255. The structured light generator 250 emits light through the illumination aperture 125. In accordance with embodiments of the present disclosure, the structured light generator 250 is configured to illuminate the local area 245 with one or more polarized structured light patterns 265 in accordance with emission instructions generated by the controller 260. The controller 260 may control operation of certain components of the structured light generator 250, based on the emission instructions. In some embodiments, the controller 260 may provide the emission instructions to a diffractive optical element of the structured light generator 250 to control a field-of-view of the local area 265 illuminated by the one or more polarized structured light patterns 265. More details about controlling the diffractive optical element of the structured light generator 250 by the controller 260 are disclosed in conjunction with FIG. 3A.

The structured light generator 250 may include a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the structured light generator can emit light having a structured light pattern.

The imaging device 255 is configured as a polarization sensitive camera that captures, through the imaging aperture 120, portions of the one or more polarized structured light patterns 265 scattered or reflected from the local area 245. The imaging device 255 captures one or more images of one or more objects in the local area 245 illuminated with the one or more polarized structured light patterns 265. The controller 260 is also configured to determine depth information for the one or more objects based on polarization information of the captured portions of the one or more scattered or reflected polarized structured light patterns. In some embodiments, the controller 260 provides the determined depth information to a console (not shown in FIG. 2) and/or an appropriate module of the HMD 100 (e.g., a varifocal module, not shown in FIG. 2). The console and/or the HMD 100 may utilize the depth information to, e.g., generate content for presentation on the electronic display 210. More details about the DCA 240 that includes the structured light generator 250 configured as a polarized structured light generator and the imaging device 255 configured as a polarization sensitive camera are disclosed in conjunction with FIG. 3A.

In some embodiments, the front rigid body 105 further comprises an eye tracking system (not shown in FIG. 2) that determines eye tracking information for the user's eye 230. The determined eye tracking information may comprise information about an orientation of the user's eye 230 in an eye-box, i.e., information about an angle of an eye-gaze. An eye-box represents a three-dimensional volume at an output of a HMD in which the user's eye is located to receive image light. In one embodiment, the user's eye 230 is illuminated with a structured light pattern. Then, the eye tracking system can use locations of the reflected structured light pattern in a captured image to determine eye position and eye-gaze. In another embodiment, the eye tracking system determines eye position and eye-gaze based on magnitudes of image light captured over a plurality of time instants.

In some embodiments, the front rigid body 105 further comprises a varifocal module (not shown in FIG. 2). The varifocal module may adjust focus of one or more images displayed on the electronic display 210, based on the eye tracking information. In one embodiment, the varifocal module adjusts focus of the displayed images and mitigates vergence-accommodation conflict by adjusting a focal distance of the optical assembly 220 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 260 to generate content for presentation on the electronic display 210.

Figure 3A:
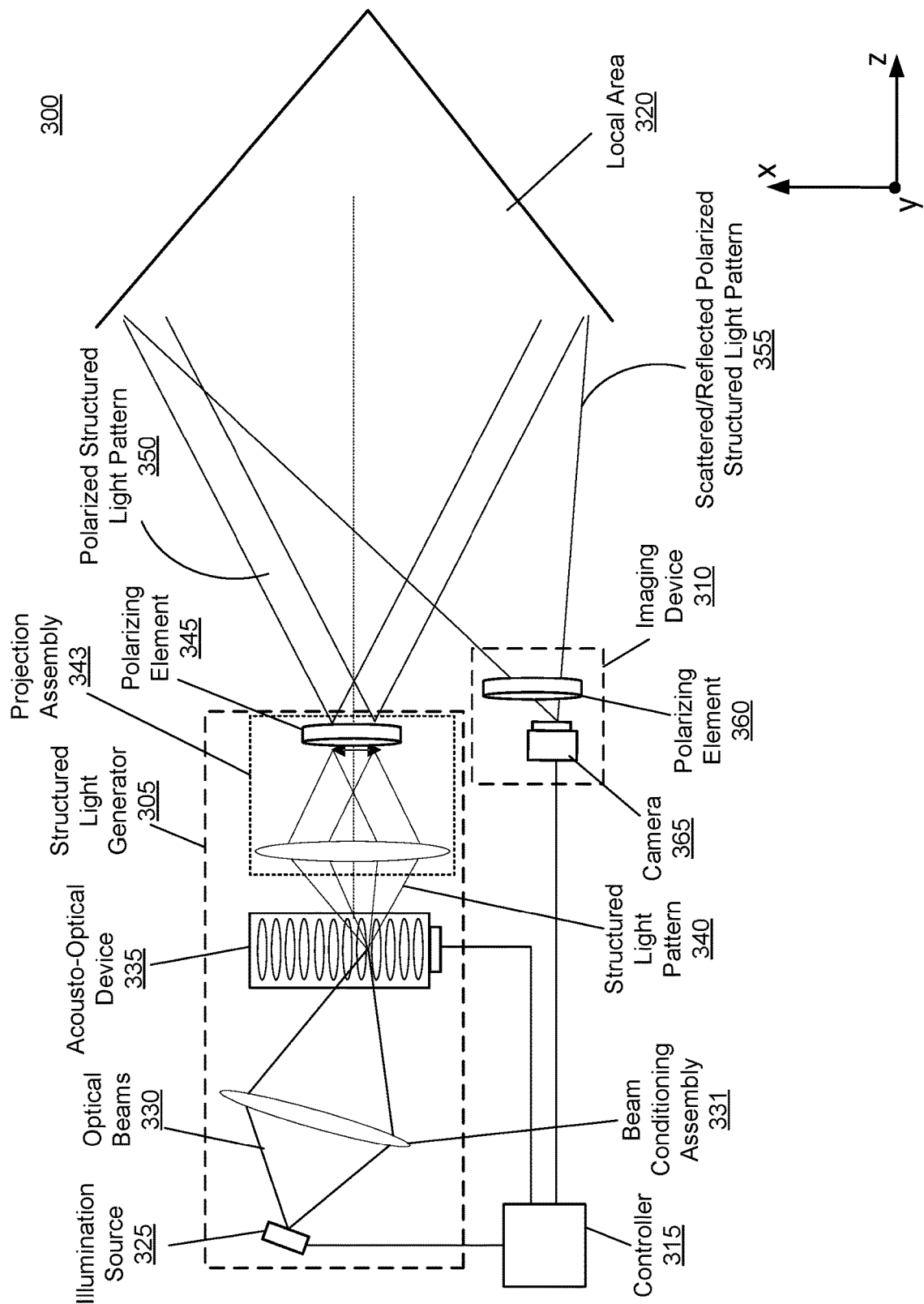
FIG. 3A is an example depth camera assembly (DCA), in accordance with an embodiment.

FIG. 3A is an example DCA 300 configured for depth sensing based on one or more polarized structured light patterns, in accordance with an embodiment. The DCA 300 includes a structured light generator 305, an imaging device 310, and a controller 315 coupled to both the structured light generator 305 and the imaging device 310. The DCA 300 may be configured to be a component of the HMD 100 in FIG. 1. Thus, the DCA 300 may be an embodiment of the DCA 240 in FIG. 2; the structured light generator 305 may be an embodiment of the structured light generator 250 in FIG. 2; and the imaging device 310 may be an embodiment of the imaging device 255 in FIG. 2.

The structured light generator 305 is configured to illuminate a local area 320 with one or more polarized structured light patterns in accordance with emission instructions from the controller 315. The structured light generator 305 includes an illumination source 325 (e.g., laser diode) configured to emit one or more optical beams 330. A beam conditioning assembly 331 collects light from the illumination source 325 and direct it toward a portion of an acousto-optic device 335. The beam conditioning assembly 331 is composed of one or more optical elements (lenses). The acousto-optic device 335 generates a structured light pattern 340 by diffracting the one or more optical beams 330. In some embodiments, the acousto-optic device 335 is configured to function as a dynamic diffraction grating that diffracts the one or more optical beams 330 to form the structured light pattern 340 based in part on emission instructions from the controller 315. The acousto-optic device 335 may include a transducer and a diffraction area (not shown in FIG. 3A). Responsive to the radio frequency in the emission instructions, the transducer of the acousto-optic device 335 can be configured to generate a sound wave in the diffraction area of the acousto-optic device 335 to form the dynamic diffraction grating.

As shown in FIG. 3A, a projection assembly 343 is positioned in front of the acousto-optic device 335. The projection assembly 343 includes one or more optical elements (lenses) and a polarizing element 345. The polarizing element 345 polarizes the structured light pattern 340 to form one or more polarized structured light patterns 350. The projection assembly 343 projects the one or more polarized structured light patterns 350 into the local area 320. In some embodiments, each of the one or more polarized structured light patterns 350 is selected from a group consisting of linearly polarized light (vertical and horizontal), right handed circularly polarized light, left handed circularly polarized light, and elliptically polarized light. The polarizing element 345 can be configured as a linear polarizer, a circular polarizer, an elliptical polarized, etc. In addition, the polarizing element 345 can be configured as adjustable, e.g., rotatable, to generate the polarized structured light pattern 355 of a specific polarization. In some embodiments, the polarizing element 345 can be rotated around its optical axis to generate a plurality of polarized structured light patterns 350, each polarized structured light pattern 350 having a different state of polarization (SOP). The rotation of the polarizing element 345 may be in accordance with rotation instructions provided to the polarizing element 345 from the controller 315.

The one or more polarized structured light patterns 350 illuminate portions of the local area 320, including one or more objects in the local area 320. One or more scattered or reflected polarized structured light patterns 355 is generated based on reflection/scattering of the one or more polarized structured light patterns 350 from the one or more objects in the local area 320. Due to the reflection/scattering, polarization of the one or more scattered polarized structured light patterns 355 may change in comparison with polarization of the one or more polarized structured light patterns 350.

The imaging device 310 includes a polarizing element 360 and a camera 365. The polarizing element 360 is positioned in front of the camera 365. The polarizing element 360 is configured to receive portions of the one or more scattered/reflected polarized structured light patterns 355 having a specific polarization and to propagate the received portions of scattered/reflected polarized light 355 to the camera 365. Thus, the imaging device 310 is configured to function as a polarization sensitive camera. In some embodiments, each of the one or more scattered/reflected polarized structured light patterns 355 is selected from a group consisting of linearly polarized light (vertical and horizontal), right handed circularly polarized light, left handed circularly polarized light, and elliptically polarized light. The polarizing element 360 can be configured as a linear polarizer, a circular polarizer, an elliptical polarized, etc. In addition, the polarizing element 360 can be configured as adjustable, e.g., rotatable, to receive and propagate the scattered polarized structured light 355 having a specific polarization. The rotation of the polarizing element 360 may be in accordance with rotation instructions provided to the polarizing element 360 from the controller 315.

The camera 365 captures one or more images of the one or more objects in the local area 320 by capturing the portions of the one or more scattered/reflected polarized structured light patterns 355. In one embodiment, the camera 365 is an infrared (IR) camera configured to capture images in the IR. In another embodiment, the camera 365 is configured to capture an image light of a visible spectrum. The camera 365 can be configured to operate with a frame rate in the range of kHz to MHz for fast detection of objects in the local area 320. In some embodiments, the polarizing element 360 is integrated with the camera 365. In alternate embodiments, the polarizing element 360 is internal to the camera 365. In some embodiments, the camera 365 is configured to have a certain inherent polarization.

In some embodiments, polarization information obtained by the imaging device 310 describes a polarization component of the captured portions of one of the scattered/reflected polarized structured light patterns 355. The polarizing element 360 and the camera 365 are configured to obtain information about the polarization component of the captured portions of the scattered/reflected polarized structured light pattern 355. In general, the polarization component of the captured portions of the scattered/reflected polarized structured light pattern 355 is orthogonal to a polarization component of the polarized structured light pattern 350. In one embodiment, the polarized structured light pattern 350 comprises a horizontally polarized light with the polarization component parallel to the z-axis in FIG. 3A. In this case, the portions of the scattered/reflected polarized structured light pattern 355 captured by the polarizing element 360 and the camera 365 comprise a vertically polarized light with the polarization component parallel to the x-axis in FIG. 3A. In another embodiment, the polarized structured light pattern 350 comprises a left handed circularly polarized light. In this case, the portions of the scattered/reflected polarized structured light pattern 355 captured by the polarizing element 360 and the camera 365 comprise a right handed circularly polarized light.

The controller 315 is configured to control operations of various components of the DCA 300 in FIG. 3A. In some embodiments, the controller 315 provides emission instructions to the illumination source 325 to control intensity of the one or more optical beams 330, modulation of the one or more optical beams 330, a time duration during which the illumination source 325 is activated, etc. The controller 315 may further create the emission instructions which include a radio frequency at which the acousto-optic device 335 is driven. The controller 315 may generate the emission instructions based on, e.g., a predetermined list of values for the radio frequency stored in a look-up table of the controller 315. In an embodiment, the predetermined radio frequencies are stored as waveforms in an electronic chip, e.g., in a direct digital synthesizer (not shown in FIG. 3A) coupled to the controller 315. In another embodiment, the emission instructions are created by a voice control integrated into the controller 315. Upon a verbal request, the voice control of the controller 315 computes a radio frequency for driving the acousto-optic device 335 to generate (after applying the polarizing element 345) the polarized structured light pattern 350 of a specific spatial frequency suitable for detection of stationary object(s) and/or tracking of moving object(s) in the local area 320 at a certain distance from the imaging device 310.

Figure 3B:
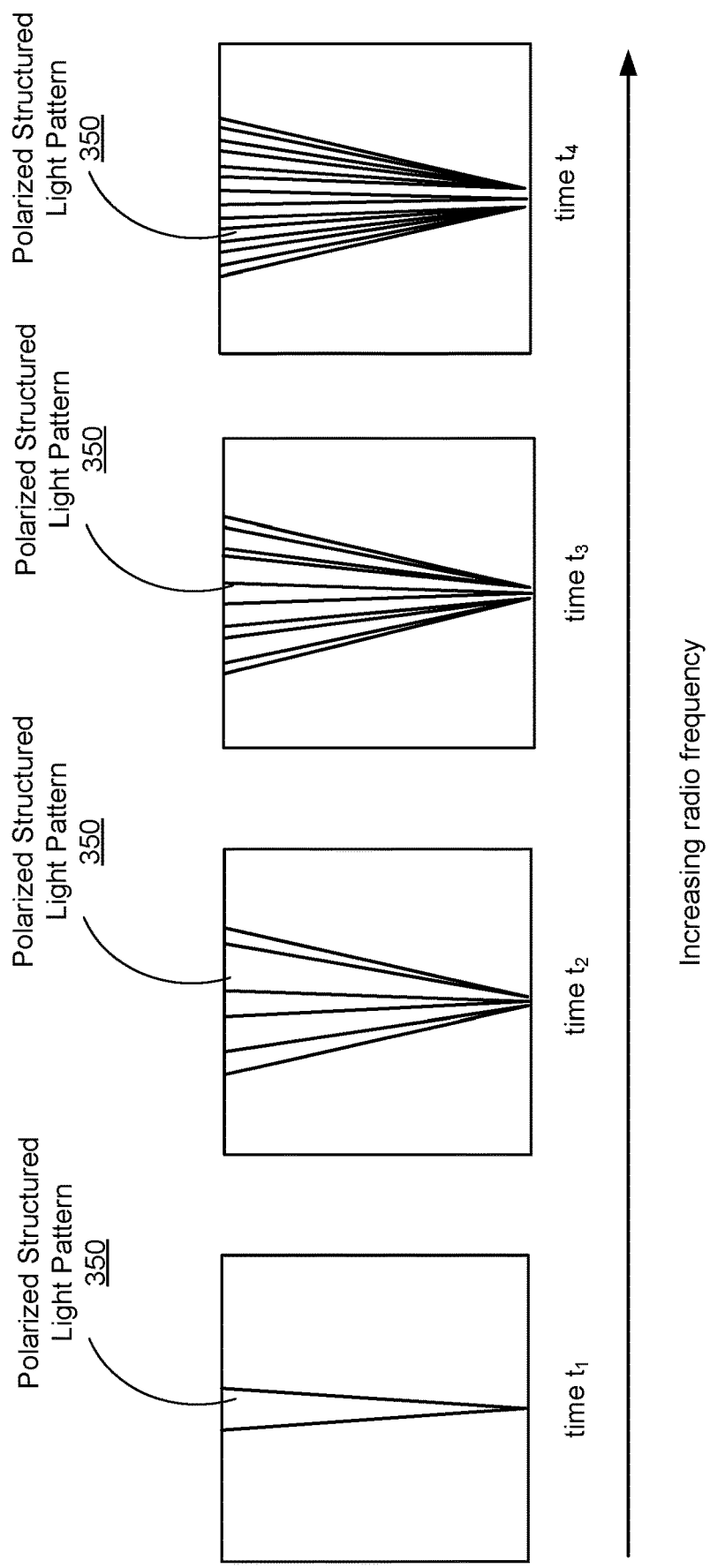
FIG. 3B illustrates multiple illumination patterns having different spatial frequencies, which may be generated by the DCA in FIG. 3A, in accordance with an embodiment.

The controller 315 can modify the radio frequency at which the acousto-optic device 335 is driven to adjust a diffraction angle at which the one or more optical beams 330 are diffracted. In this way, the controller 315 can instruct the acousto-optic device 335 to scan a plurality of diffraction angles at which the one or more optical beams 330 are diffracted and interfered to form the structured light pattern 340. A radio frequency at which the acousto-optic device 335 is driven controls a separation of the optical beams 330 diffracted by the acousto-optic device 335. Hence, a spatial frequency of the resulting structured light pattern 340 (and of the polarized structured light pattern 350) directly depends on the radio frequency at which the acousto-optic device 335 is driven. FIG. 3B illustrates four different illumination patterns 350 (polarized structured light patterns 350) generated by the DCA 300 in FIG. 3A in four different time instants $t_1$, $t_2$, $t_3$ and $t_4$. Each illumination pattern 350 in FIG. 3B has a different spatial frequency or a separation of optical beams that form that illumination pattern 350. The spatial frequency of the illumination pattern 350 increases as the radio frequency at which the acousto-optic device 335 is driven increases, and vice versa.

In some embodiments, the controller 315 is further configured to generate rotation instructions and provide the rotation instructions to the polarizing element 345 for rotating the polarizing element 345 and generating a plurality of polarized structured light patterns having different SOPs. As shown in FIG. 3A, the controller 315 is further coupled to the camera 365 and can be configured to determine depth information for the one or more objects in the local area 320. In some embodiments, as discussed in more detail below, the controller 315 can determine a coarse depth map of the local area 320 based on phase shifted illumination. In this operational mode of the DCA 300, the illumination pattern 350 and the light pattern 355 scattered/reflected from the local area 320 shown in FIG. 3A represent phase shifted illuminations. Once the coarse depth map is determined, the controller 315 may then enhance resolution of the depth map of the local area 320 based on polarization information of the captured portions of the one or more scattered/reflected polarized structured light patterns 355.

On the side of the structured light generator 305, the controller 315 may be configured to provide appropriate instructions to one or more components of the structured light generator 305 to generate at least three phase shifted illumination patterns 350 that illuminate the local area 320. The phase shifted illumination patterns 350 may be generated by sending time delayed radio frequency signals from the controller 315 to the acousto-optic device 335. Each relative time delay may be pre-calculated at the controller 315 to yield a desired phase shift. Hence several phase-shifted illumination patterns 350 may be projected to the object(s) in the local area 320. The imaging device 310 may capture the phase-shifted patterns 355 that are distorted by the shape of the object(s) in the local area 320. Then, the controller 315 may use triangulation calculation to obtain in real time a coarse depth map of the local area 320. In one embodiment, the camera 365 is configured to perform phase measurements of the captured light patterns 355 scattered/reflected from the illuminated local area 320. The controller 315 may then reconstruct the course depth map of the local area 320, based on the phase measurements.

To enhance a local resolution of the depth map of the local area 320, different SOPs of the polarized structured light patterns 350 and of the scattered/reflected polarized structured light patterns 355 are utilized by the controller 315 for computation of Stokes parameters, which provide a surface normal map. In addition, the controller 315 can compute in real time an index of refraction map of objects in the local area 320 using Fresnel reflection coefficients determined from the Stokes parameters. The index of refraction map can be used to determine certain properties of the objects in the local area 320, such as surface roughness and transparency. In an illustrative embodiment of detecting a transparent object in the local area 320, an index of refraction is used to determine if the object is transparent, e.g., glass. The controller 315 can be configured to compare the index of refraction associated with the object with a pre-stored index of refraction value, e.g., pre-stored in a look-up table of the controller 315. In addition, the controller 315 can be configured to determine, based on the Stokes parameters, a degree of polarization (DOP) map for one or more objects in the local area 320, which facilitates identifying specular and diffuse objects. By measuring Stokes parameters for different SOPs of the scattered/reflected polarized structured light patterns 355, the controller 315 can determine a local depth map, as well as a DOP, an index of refraction and Fresnel reflection coefficients for each pixel measurement at the camera 365. This may provide continuous maps of index of refraction, DOP and Stoke parameter profile. Details about determining the Stokes parameters, surface normal map, index of refraction map and DOP map are discussed in more detail below.

In some embodiments, the polarizing element 345 can change the polarization of the structured light pattern 350 in three steps as the polarizing element 345 is rotated around its axis. In a first time instant, the controller 315 may instruct the polarizing element 345 to stand still to generate a horizontally polarized structured light pattern 350. In a second time instant, the controller 315 may instruct the polarizing element 345 to rotate by 45° around the z axis to generate 45-degree polarized structured light pattern 350. In a third time instant, the controller 315 may instruct the polarizing element 345 to rotate by 90° around the z axis to generate a vertically polarized structured light pattern 350. Thus, the polarizing element 345 can be configured as a fast rotating polarizer with three SOPs encoded, e.g., horizontal, vertical and 45-degree polarization.

In addition, in a fourth time instant, the acousto-optic device 335 can directly generate, without utilizing the polarizing element 345, a circularly polarized structured light pattern 350, e.g., a left handed circularly polarized light pattern 350. In one embodiment, the acousto-optic device 335 directly generates the circularly polarized structured light pattern 350 by orienting the optical beam 330 to a crystal in the acousto-optic device 335 in a geometry satisfying the Bragg phase matching condition. The incoming optical beam 330 may have a SOP that is optimized such that the optical beam 330 is diffracted by a phase grating in the crystal of the acousto-optic device 335 into a diffracted optical beam having a circular SOP. The diffracted optical beam at the output of the acousto-optic device 335 may have a circular SOP with high efficiency satisfying the Bragg phase matching condition. The Bragg phase matching condition is satisfied when energy is conversed between the incoming optical beam vector, the phase grating vector and the diffracted optical beam. The Bragg phase matching condition is usually described $$\theta_B = \sin^{-1}\left(\frac{\lambda}{2\lambda_a}\right),$$

by where $\lambda$ is a wavelength of the incoming optical beam 330, $\lambda_a$ is a wavelength of an acoustic wave in the crystal of the acousto-optic device 335, and $\theta_B$ is a diffraction angle of the optical beam diffracted from the acousto-optic device 335.

Stokes illumination parameters $s=(s_0, s_1, s_2, s_3)$ for the polarized structured light patterns 350 having different SOPs can be then computed as:

$$s=(s_0,s_1,s_2,s_3)=(P_H+P_V, P_H-P_V, 2\cdot P_{45}-s_0, s_0-2\cdot P_{LHC}), \quad (1)$$

where $s_0=P_H+P_V$, $s_1=P_H-P_V$, $s_2=2\cdot P_{45}-s_0$, $s_3=s_0-2\cdot P_{LHC}$, $P_H$ is a power of the horizontally polarized structured light pattern 350, $P_V$ is a power of the vertically polarized structured light pattern 350, $P_{45}$ is a power of the 45-degree polarized structured light pattern 350, and $P_{LHC}$ is a power of the left handed circularly polarized structured light pattern 350.

The polarizing element 360 and the camera 365 are configured to detect a number of different SOPs (e.g., four different SOPs) for the scattered/reflected polarized structured light pattern 355 captured by the polarizing element 360 and the camera 365. The controller 315 coupled to the camera 365 can be configured to compute Stokes reflectance parameters, based on the detected SOPs. In some embodiments, the polarizing element 360 can be configured (e.g., rotated or properly adjusted as instructed by the controller 315) to detect a horizontally polarized scattered/reflected structured light pattern 355. The polarizing element 360 can be further configured (e.g., rotated or properly adjusted as instructed by the controller 315) to detect a 45-degree polarized scattered/reflected structured light pattern 355. The polarizing element 360 can be further configured (e.g., rotated or properly adjusted as instructed by the controller 315) to detect a vertically polarized scattered/reflected structured light pattern 355. The polarizing element 360 can be further configured to detect a circularly polarized scattered/reflected structured light pattern 355 (e.g., left handed circularly polarized structured light pattern 355). The controller 315 can be configured to calculate Stokes reflectance parameters $s'=(s_0', s_1', s_2', s_3')$ based on power of polarized scattered/reflected structured light patterns 355 having different detected SOPs (e.g., horizontal, vertical, 45-degree and left handed circularly polarized) as defined for determining the Stokes illumination parameters in equation (1).

Given the computed Stokes reflectance parameters $s'=(s_0', s_1', s_2', s_3')$ for each pixel of the camera 365, a DOP associated with that pixel can be computed as:

$$DOP = \frac{\sqrt{(s_1')^2 + (s_2')^2 + (s_3')^2}}{s_0'}. \quad (2)$$

An index of refraction associated with a pixel of the camera 365 can be computed as:

$$\gamma^2 = \frac{(1+\sqrt{R_{para}})\cdot(1+\sqrt{R_{perp}})}{(1-\sqrt{R_{para}})\cdot(1-\sqrt{R_{perp}})}, \quad (3)$$

where $\gamma$ is an index of refraction, $R_{para}$ is a parallel Fresnel reflection parameter, and $R_{perp}$ is a perpendicular Fresnel reflection parameter. The Fresnel reflection parameters $R_{para}$ and $R_{perp}$ can be obtained by substituting to the Stokes reflectance parameters in the Mueller matrix. Note that equation (3) yields an accurate approximation to the index of refraction for both rough and specular object surfaces.

In one embodiment, detection of different SOPs can be sequential as the polarizing element 360 is rotated around its axis in a similar manner as the polarizing element 345 of the structured light generator 305. In another embodiment, detection of different SOPs can be performed simultaneously as the polarizing element 360 and the camera 365 are configured to simultaneously detect different SOPs. Different SOPs detected by the imaging device 310 represent polarization information that can be utilized by the controller 315 to determine high resolution local depth information using surface normal computations obtained from the Stokes reflectance parameters for the local area 320. A surface normal is represented by azimuth and zenith angles, as shown in FIG. 3C.

Figure 3C:
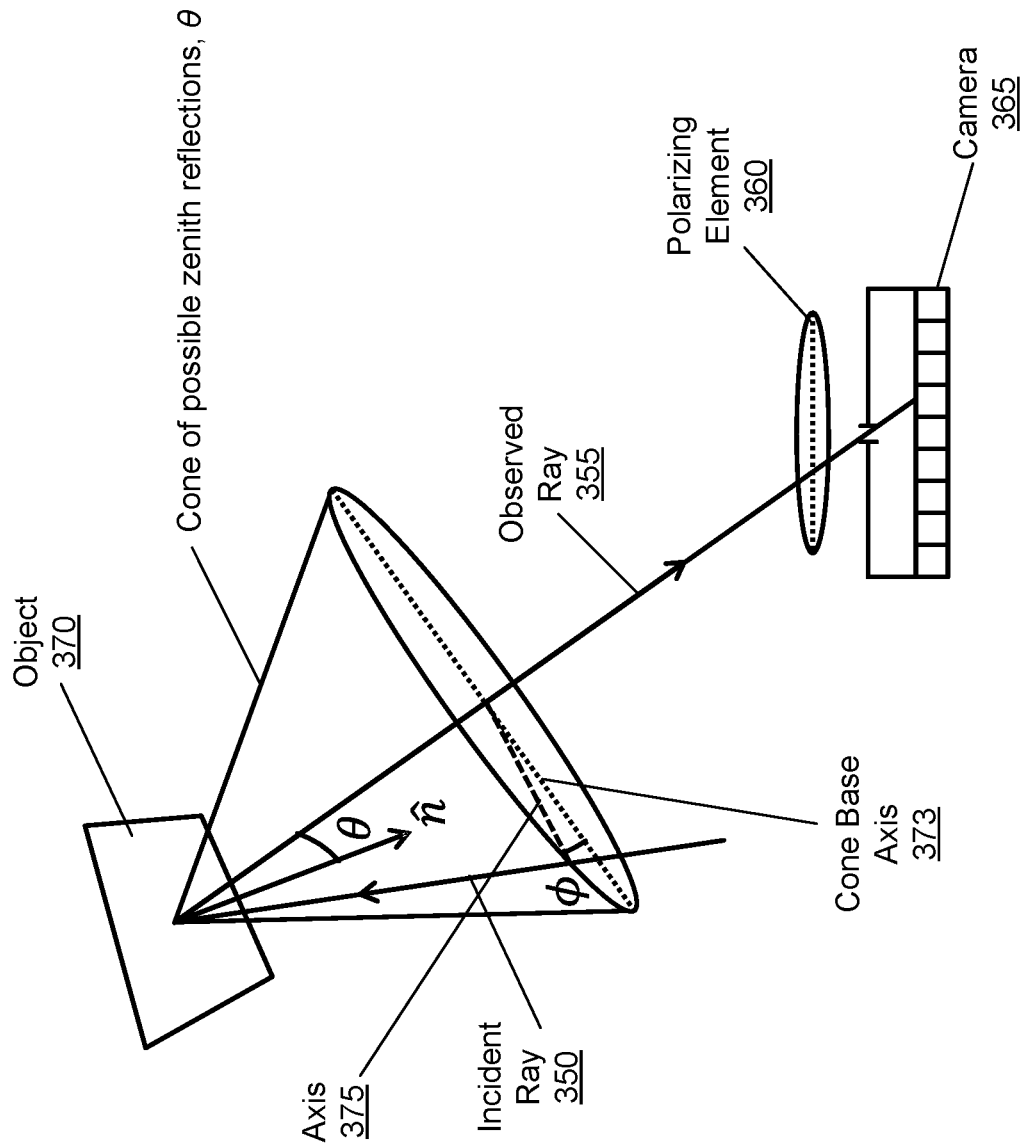
FIG. 3C illustrates zenith and azimuthal angles representing a surface normal as measured by a pixel of a camera of the DCA shown in FIG. 3A, in accordance with an embodiment.

FIG. 3C illustrates zenith and azimuthal angles representing a surface normal as measured by a pixel of the camera 365 of the DCA 300, in accordance with an embodiment. As shown in FIG. 3C, an object 370 in the local area 320 is illuminated by an incident ray of the polarized structured light pattern 350. An observed ray of the scattered/reflected polarized structured light pattern 355 is captured by the polarizing element 360 and a pixel of the camera 365. As illustrated in FIG. 3C, the zenith angle θ represents an angle between the observed ray 355 and an axis n normal to an incident surface of the object 370. The azimuth angle φ represents an angle between an axis 373 of a basis of a cone of possible zenith reflections and an axis 375 that connects the incident ray 350 and the observed ray 355. It can be shown that the surface normal represented by the azimuth and zenith angles can be derived as:

$$\phi = \frac{1}{2}\arctan\left(\frac{s'_2}{s'_1}\right), \text{ and} \quad (4)$$

$$\theta = \arctan\left(\frac{s'_3}{\sqrt{(s'_1)^2 + (s'_2)^2}}\right). \quad (5)$$

In some embodiments, the controller 315 calculates Stokes reflectance parameters for one or more objects in the local area 320 based on the polarization information of the portions of the multiple scattered/reflected polarized structured light patterns 355 captured by the polarizing element 360 and the camera 365. The controller 315 determines the depth information for the one or more objects in the local area 320 based on the Stokes reflectance parameters. To determine the depth information of the one or more objects in the local area 320, the controller 315 maps the calculated Stokes reflectance parameters into a set of position points (e.g., on the Poincare sphere) for each object in the local area 320. Each position point in the set on the Poincare sphere is represented by a three-dimensional coordinate (surface normals) and a SOP of the polarized structured light pattern 355 scattered/reflected from that object. The controller 315 may further determine, based on the Stokes reflectance parameters as shown in equation (2), a DOP map for the polarized structured light pattern 355 scattered/reflected from each object in the local area 320. The controller 315 may then determine properties of each object based on the determined DOP map. For example, the controller 315 identifies the portions of the scattered/reflected polarized structured light pattern 355 captured by the imaging device 310 as a ballistic back-scattered light based on the DOP value approximately equal to one, which may correspond to an object in the local area 320 having a smooth surface. Alternatively, the controller 315 identifies the portions of the scattered/reflected polarized structured light pattern 355 captured by the imaging device 310 as a multi-path scattered light pattern based on the DOP value approximately equal to zero, which corresponds to an object in the local area 320 having a rough surface. As the imaging device 310 is configured to capture polarization information of the portions of the one or more scattered/reflected polarized structured light patterns 355, the controller 315 can determine depth information for both birefringent and non-birefringent objects in the local area 320.

Figure 4:
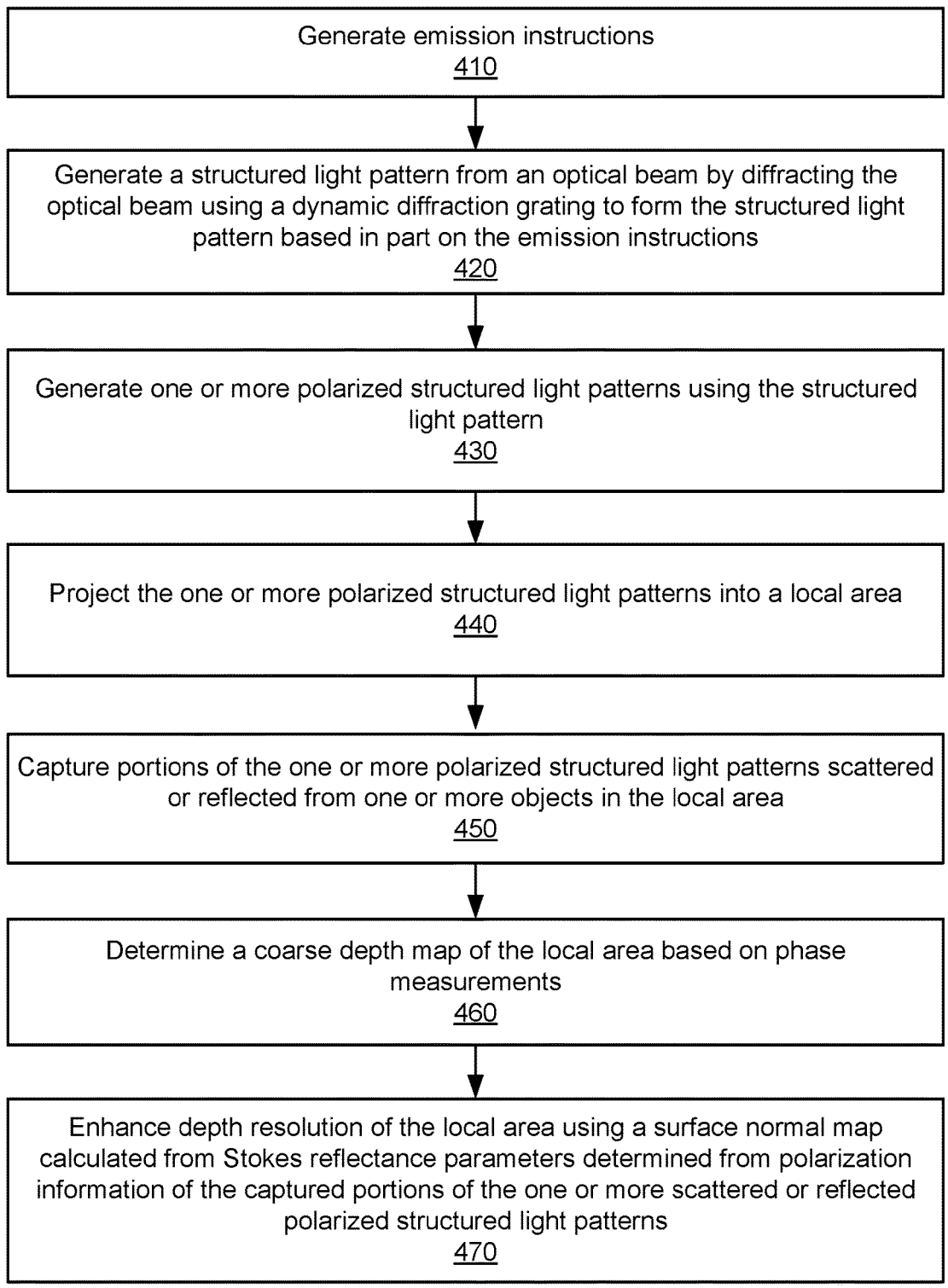
FIG. 4 is a flow chart illustrating a process of determining depth information of objects in a local area based on one or more polarized structured light patterns, in accordance with an embodiment.

FIG. 4 is a flow chart illustrating a process 400 of determining depth information of objects in a local area based on one or more polarized structured light patterns, which may be implemented at the HMD 100 shown in FIG. 1, in accordance with an embodiment. The process 400 of FIG. 4 may be performed by the components of a DCA (e.g., the DCA 300). Other entities (e.g., a HMD and/or console) may perform some or all of the steps of the process in other embodiments. Likewise, embodiments may include different and/or additional steps, or perform the steps in different orders.

The DCA generates 410 (e.g., via a controller) emission instructions. The DCA may provide the emission instructions to an illumination source and a diffractive optical element within the DCA. Based on the emission instructions, the illumination source may emit an optical beam. In some embodiments, the DCA generates the emission instructions which include information about a radio frequency. Responsive to the radio frequency in the emission instructions, the DCA generates a sound wave within the diffractive optical element implemented as an acousto-optic device to form a dynamic diffraction grating.

The DCA generates 420 (e.g., via a diffractive optical element) a structured light pattern from the optical beam by diffracting the optical beam using the dynamic diffraction grating to form the structured light pattern, based in part on the emission instructions. In some embodiments, the DCA modifies the radio frequency in the emission instructions to adjust a diffraction angle at which the optical beam is diffracted and interfered to form the structured light pattern.

The DCA generates 430 (e.g., via a polarizing element) one or more polarized structured light patterns using the structured light pattern. In one embodiment, the DCA generates 430 a polarized structured light pattern comprising linearly polarized light (horizontal or vertical), right handed circularly polarized light, left handed circularly polarized light, elliptically polarized light, or light of some other polarization. In another embodiment, the DCA generates 430 (e.g., by rotating the polarizing element around its optical axes) multiple polarized structured light patterns each having a different polarization. For example, the polarizing element can change the polarization of the structured light pattern into three different SOPs in multiple steps as the polarizing element is rotated around its axis by multiple different angles during multiple consecutive time instants.

The DCA projects 440 (e.g., via a projection assembly) the one or more polarized structured light patterns into a local area. In some embodiments, the DCA projects 440 the one or more polarized structured light patterns to illuminate a wide field-of-view of the local area for accurate depth scanning. The DCA may also control (e.g., via the controller) a size of the illuminated portion of the local area by controlling the dynamic diffraction grating within the DCA.

The DCA captures 450 (e.g., via an imaging device) portions of the one or more polarized structured light patterns scattered or reflected from one or more objects in the local area. In one embodiment, the DCA determines the polarization information as a polarization component of the captured portions of one of the scattered or reflected polarized structured light patterns. The polarization component of the captured portions of the scattered polarized structured light pattern may be orthogonal to a polarization component of the polarized structured light pattern. In another embodiment, the DCA determines the polarization information of the captured portions of the scattered or reflected polarized structured light patterns as information about different SOPs for the portions of the scattered or reflected polarized structured light patterns captured by the imaging device. For example, as discussed above, the imaging device of the DCA includes a polarizing element and a camera, wherein the polarizing element is positioned in front of the camera. The polarizing element is configured to receive portions of one or more scattered or reflected polarized structured light patterns having a specific polarization and to propagate the received portions of scattered or reflected polarized light patterns to the camera.

The DCA determines 460 (e.g., via the controller) a coarse depth map of the local area based on phase measurements. In some embodiments, as discussed, phase shifting is applied to light patterns that illuminate the one or more objects in the local area. The DCA captures (e.g., via the imaging device) the phase-shifted patterns that are distorted by the shape of the one or more objects in the local area. The DCA can use triangulation calculation to obtain the coarse depth map of the local area.

The DCA enhances 470 (e.g., via the controller) depth resolution of the local area using a surface normal map calculated from Stokes reflectance parameters determined from polarization information of the captured portions of the one or more scattered or reflected polarized structured light patterns. In some embodiments, as discussed, the DCA further enhances depth resolution of the local area by calculating an index of refraction map for the one or more objects based on the Stokes reflectance parameters. The DCA can determine surface roughness and identify transparent objects based on the index of refraction map. Furthermore, the DCA can compute a DOP map for the one or more objects in the local area based on the Stokes reflectance parameters. The DCA may determine diffuse or specular properties of objects based on the determined DOP map. Thus, the DCA determines depth information for the one or more objects in the local area based at least in part on the surface normal map computed using the Stokes reflectance parameters for a high resolution local depth map, and the DCA utilizes the phase shifted illumination patterns for computing the course depth map of the local area.

In some embodiments, the DCA is configured as part of a HMD, e.g., the HMD 100 in FIG. 1. In one embodiment, the DCA provides the determined depth information to a console coupled to the HMD. The console is then configured to generate content for presentation on an electronic display of the HMD, based on the depth information. In another embodiment, the DCA provides the determined depth information to a module of the HMD that generates content for presentation on the electronic display of the HMD, based on the depth information. In an alternate embodiment, the DCA is integrated into a HMD as part of an AR system. In this case, the DCA may be configured to sense and display objects behind a head of a user wearing the HMD or display objects recorded previously.

System Environment

Figure 5:
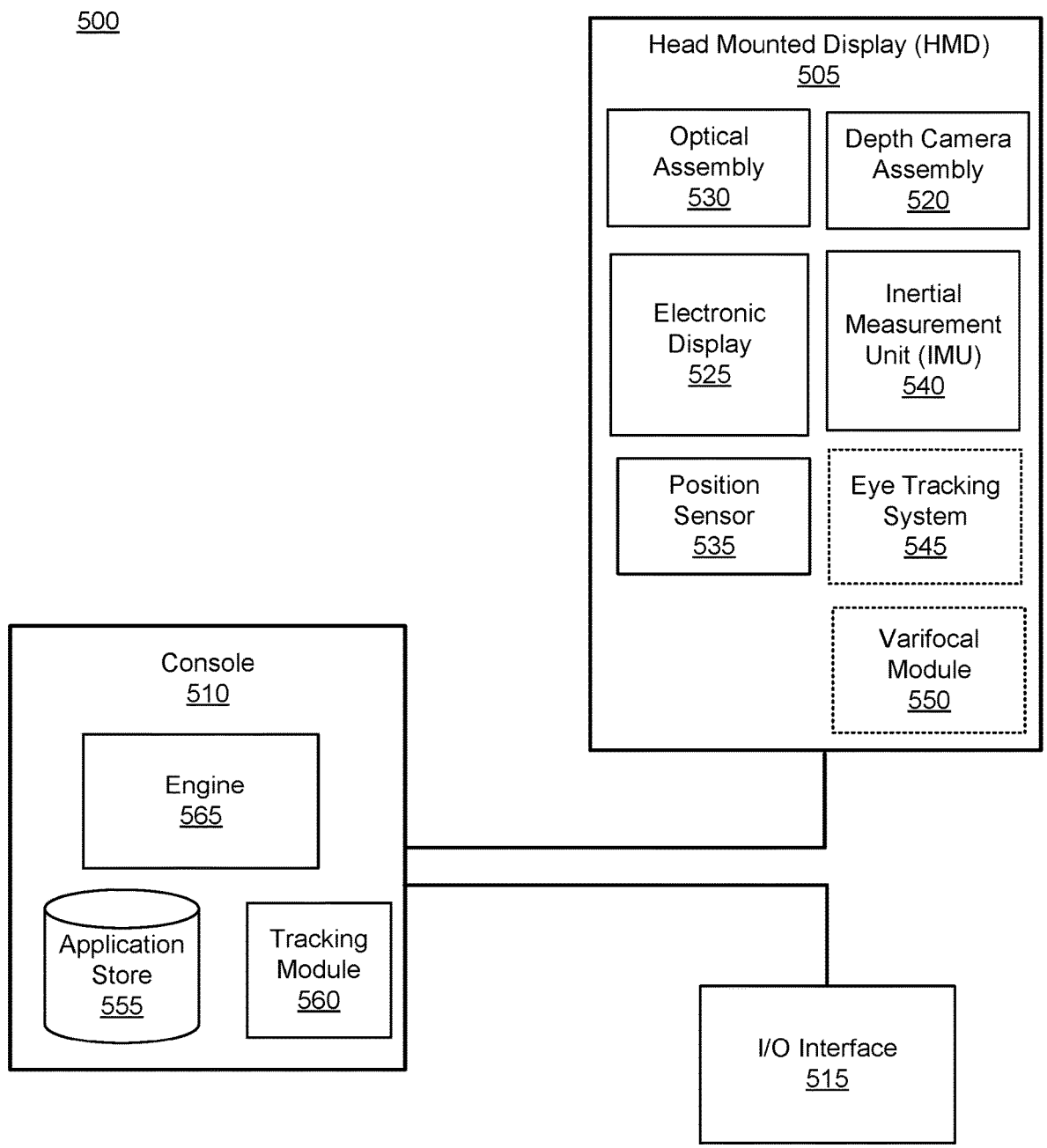
FIG. 5 is a block diagram of a HMD system in which a console operates, in accordance with an embodiment.

FIG. 5 is a block diagram of one embodiment of a HMD system 500 in which a console 510 operates. The HMD system 500 may operate in a VR system environment, an AR system environment, a MR system environment, or some combination thereof. The HMD system 500 shown by FIG. 5 comprises a HMD 505 and an input/output (I/O) interface 515 that is coupled to the console 510. While FIG. 5 shows an example HMD system 500 including one HMD 505 and on I/O interface 515, in other embodiments any number of these components may be included in the HMD system 500. For example, there may be multiple HMDs 505 each having an associated I/O interface 515, with each HMD 505 and I/O interface 515 communicating with the console 510. In alternative configurations, different and/or additional components may be included in the HMD system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by the HMD 505.

The HMD 505 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 505, the console 510, or both, and presents audio data based on the audio information. The HMD 505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 505 is the HMD 100 described above in conjunction with FIG. 1.

The HMD 505 includes a DCA 520, an electronic display 525, an optical assembly 530, one or more position sensors 535, an IMU 540, an optional eye tracking system 545, and an optional varifocal module 550. Some embodiments of the HMD 505 have different components than those described in conjunction with FIG. 5. Additionally, the functionality provided by various components described in conjunction with FIG. 5 may be differently distributed among the components of the HMD 505 in other embodiments.

The DCA 520 captures data describing depth information of an area surrounding some or all of the HMD 505. The DCA 520 can compute the depth information using the data (e.g., based on captured portions of one or more scattered polarized structured light patterns), or the DCA 520 can send this information to another device such as the console 510 that can determine the depth information using the data from the DCA 520.

The DCA 520 includes a structured light generator, an imaging device and a controller that may be coupled to both the light generator and the imaging device. The structured light generator of the DCA 520 is configured to illuminate a local area with one or more polarized structured light patterns in accordance with emission instructions from the controller. The structured light generator comprises an illumination source, an acousto-optic device, a polarizing element, and a projection assembly. The illumination source is configured to emit an optical beam. The acousto-optic device generates a structured light pattern from the optical beam, wherein the acousto-optic device is configured to function as a dynamic diffraction grating that diffracts the optical beam to form the structured light pattern based in part on the emission instructions. The polarizing element generates the one or more polarized structured light patterns using the structured light pattern. The projection assembly is configured to project the one or more polarized structured light patterns into the local area. The imaging device of the DCA 520 is configured to capture portions of the one or more polarized structured light patterns scattered from one or more objects in the local area. The controller of the DCA 520 generates the emission instructions and provides the emission instructions to the light generator. The controller is also configured to determine depth information for the one or more objects based on polarization information of the captured portions of the one or more scattered polarized structured light patterns. The DCA 520 is an embodiment of the DCA 240 in FIG. 2 or the DCA 300 in FIG. 3A.

The electronic display 525 displays 2D or 3D images to the user in accordance with data received from the console 510. In various embodiments, the electronic display 525 comprises a single electronic display or multiple electronic displays (e.g., a display for each eye of a user). Examples of the electronic display 525 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optical assembly 530 magnifies image light received from the electronic display 525, corrects optical errors associated with the image light, and presents the corrected image light to a user of the HMD 505. The optical assembly 530 includes a plurality of optical elements. Example optical elements included in the optical assembly 530 include: an aperture, a Fresnel lens, a convex lens, a concave lens, a filter, a reflecting surface, or any other suitable optical element that affects image light. Moreover, the optical assembly 530 may include combinations of different optical elements. In some embodiments, one or more of the optical elements in the optical assembly 530 may have one or more coatings, such as partially reflective or anti-reflective coatings.

Magnification and focusing of the image light by the optical assembly 530 allows the electronic display 525 to be physically smaller, weigh less and consume less power than larger displays. Additionally, magnification may increase the field of view of the content presented by the electronic display 525. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 530 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 525 for display is pre-distorted, and the optical assembly 530 corrects the distortion when it receives image light from the electronic display 525 generated based on the content.

The IMU 540 is an electronic device that generates data indicating a position of the HMD 505 based on measurement signals received from one or more of the position sensors 535 and from depth information received from the DCA 520. A position sensor 535 generates one or more measurement signals in response to motion of the HMD 505. Examples of position sensors 535 include: one or more accelerometers, one or more gyroscopes, one or more magnetometers, another suitable type of sensor that detects motion, a type of sensor used for error correction of the IMU 540, or some combination thereof. The position sensors 535 may be located external to the IMU 540, internal to the IMU 540, or some combination thereof.

Based on the one or more measurement signals from one or more position sensors 535, the IMU 540 generates data indicating an estimated current position of the HMD 505 relative to an initial position of the HMD 505. For example, the position sensors 535 include multiple accelerometers to measure translational motion (forward/back, up/down, left/right) and multiple gyroscopes to measure rotational motion (e.g., pitch, yaw, roll). In some embodiments, the IMU 540 rapidly samples the measurement signals and calculates the estimated current position of the HMD 505 from the sampled data. For example, the IMU 540 integrates the measurement signals received from the accelerometers over time to estimate a velocity vector and integrates the velocity vector over time to determine an estimated current position of a reference point on the HMD 505. Alternatively, the IMU 540 provides the sampled measurement signals to the console 510, which interprets the data to reduce error. The reference point is a point that may be used to describe the position of the HMD 505. The reference point may generally be defined as a point in space or a position related to the HMD's 505 orientation and position.

The IMU 540 receives one or more parameters from the console 510. The one or more parameters are used to maintain tracking of the HMD 505. Based on a received parameter, the IMU 540 may adjust one or more IMU parameters (e.g., sample rate). In some embodiments, certain parameters cause the IMU 540 to update an initial position of the reference point so it corresponds to a next position of the reference point. Updating the initial position of the reference point as the next calibrated position of the reference point helps reduce accumulated error associated with the current position estimated the IMU 540. The accumulated error, also referred to as drift error, causes the estimated position of the reference point to "drift" away from the actual position of the reference point over time. In some embodiments of the HMD 505, the IMU 540 may be a dedicated hardware component. In other embodiments, the IMU 540 may be a software component implemented in one or more processors.

In some embodiments, the eye tracking system 545 is integrated into the HMD 505. The eye tracking system 545 determines eye tracking information associated with an eye of a user wearing the HMD 505. The eye tracking information determined by the eye tracking system 545 may comprise information about an orientation of the user's eye, i.e., information about an angle of an eye-gaze. In some embodiments, the eye tracking system 545 is integrated into the optical assembly 530. An embodiment of the eye-tracking system 545 may comprise an illumination source and an imaging device (camera).

In some embodiments, the varifocal module 550 is further integrated into the HMD 505. The varifocal module 550 may be coupled to the eye tracking system 545 to obtain eye tracking information determined by the eye tracking system 545. The varifocal module 550 may be configured to adjust focus of one or more images displayed on the electronic display 525, based on the determined eye tracking information obtained from the eye tracking system 545. In this way, the varifocal module 550 can mitigate vergence-accommodation conflict in relation to image light. The varifocal module 550 can be interfaced (e.g., either mechanically or electrically) with at least one of the electronic display 525 and at least one optical element of the optical assembly 530. Then, the varifocal module 550 may be configured to adjust focus of the one or more images displayed on the electronic display 525 by adjusting position of at least one of the electronic display 525 and the at least one optical element of the optical assembly 530, based on the determined eye tracking information obtained from the eye tracking system 545. By adjusting the position, the varifocal module 550 varies focus of image light output from the electronic display 525 towards the user's eye. The varifocal module 550 may be also configured to adjust resolution of the images displayed on the electronic display 525 by performing foveated rendering of the displayed images, based at least in part on the determined eye tracking information obtained from the eye tracking system 545. In this case, the varifocal module 550 provides appropriate image signals to the electronic display 525. The varifocal module 550 provides image signals with a maximum pixel density for the electronic display 525 only in a foveal region of the user's eye-gaze, while providing image signals with lower pixel densities in other regions of the electronic display 525. In one embodiment, the varifocal module 550 may utilize the depth information obtained by the DCA 520 to, e.g., generate content for presentation on the electronic display 525.

The I/O interface 515 is a device that allows a user to send action requests and receive responses from the console 510. An action request is a request to perform a particular action. For example, an action request may be an instruction to start or end capture of image or video data or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 515 includes an IMU 540 that captures calibration data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the HMD 505 for processing in accordance with information received from one or more of: the DCA 520, the HMD 505, and the I/O interface 515. In the example shown in FIG. 5, the console 510 includes an application store 555, a tracking module 560, and an engine 565. Some embodiments of the console 510 have different modules or components than those described in conjunction with FIG. 5. Similarly, the functions further described below may be distributed among components of the console 510 in a different manner than described in conjunction with FIG. 5.

The application store 555 stores one or more applications for execution by the console 510. An application is a group of instructions, that when executed by a processor, generates content for presentation to the user. Content generated by an application may be in response to inputs received from the user via movement of the HMD 505 or the I/O interface 515. Examples of applications include: gaming applications, conferencing applications, video playback applications, or other suitable applications.

The tracking module 560 calibrates the HMD system 500 using one or more calibration parameters and may adjust one or more calibration parameters to reduce error in determination of the position of the HMD 505 or of the I/O interface 515. For example, the tracking module 560 communicates a calibration parameter to the DCA 520 to adjust the focus of the DCA 520 to more accurately determine positions of structured light elements captured by the DCA 520. Calibration performed by the tracking module 560 also accounts for information received from the IMU 540 in the HMD 505 and/or an IMU 540 included in the I/O interface 515. Additionally, if tracking of the HMD 505 is lost (e.g., the DCA 520 loses line of sight of at least a threshold number of structured light elements), the tracking module 560 may re-calibrate some or all of the HMD system 500.

The tracking module 560 tracks movements of the HMD 505 or of the I/O interface 515 using information from the DCA 520, the one or more position sensors 535, the IMU 540 or some combination thereof. For example, the tracking module 550 determines a position of a reference point of the HMD 505 in a mapping of a local area based on information from the HMD 505. The tracking module 560 may also determine positions of the reference point of the HMD 505 or a reference point of the I/O interface 515 using data indicating a position of the HMD 505 from the IMU 540 or using data indicating a position of the I/O interface 515 from an IMU 540 included in the I/O interface 515, respectively. Additionally, in some embodiments, the tracking module 560 may use portions of data indicating a position or the HMD 505 from the IMU 540 as well as representations of the local area from the DCA 520 to predict a future location of the HMD 505. The tracking module 560 provides the estimated or predicted future position of the HMD 505 or the I/O interface 515 to the engine 555.

The engine 565 generates a 3D mapping of the area surrounding some or all of the HMD 505 (i.e., the "local area") based on information received from the HMD 505. In some embodiments, the engine 565 determines depth information for the 3D mapping of the local area based on information received from the DCA 520 that is relevant for techniques used in computing depth. The engine 565 may calculate depth information using one or more techniques in computing depth from one or more polarized structured light patterns. In various embodiments, the engine 565 uses the depth information to, e.g., update a model of the local area, and generate content based in part on the updated model.

The engine 565 also executes applications within the HMD system 500 and receives position information, acceleration information, velocity information, predicted future positions, or some combination thereof, of the HMD 505 from the tracking module 560. Based on the received information, the engine 565 determines content to provide to the HMD 505 for presentation to the user. For example, if the received information indicates that the user has looked to the left, the engine 565 generates content for the HMD 505 that mirrors the user's movement in a virtual environment or in an environment augmenting the local area with additional content. Additionally, the engine 565 performs an action within an application executing on the console 510 in response to an action request received from the I/O interface 515 and provides feedback to the user that the action was performed. The provided feedback may be visual or audible feedback via the HMD 505 or haptic feedback via the I/O interface 515.

In some embodiments, based on the eye tracking information (e.g., orientation of the user's eye) received from the eye tracking system 545, the engine 565 determines resolution of the content provided to the HMD 505 for presentation to the user on the electronic display 525. The engine 565 provides the content to the HMD 605 having a maximum pixel resolution on the electronic display 525 in a foveal region of the user's gaze, whereas the engine 565 provides a lower pixel resolution in other regions of the electronic display 525, thus achieving less power consumption at the HMD 505 and saving computing cycles of the console 510 without compromising a visual experience of the user. In some embodiments, the engine 565 can further use the eye tracking information to adjust where objects are displayed on the electronic display 525 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
   an illumination source configured to emit an optical beam;
   an acousto-optic device configured to function as a dynamic diffraction grating that diffracts the optical beam to form at least one structured light pattern;
   a polarizing element configured to rotate over a time period to generate a plurality of polarized structured light patterns from the at least one structured light pattern for projection into a local area, each polarized structured light pattern corresponding to a different rotational position of the polarizing element;
   an imaging device configured to capture a version of each polarized structured light pattern scattered or reflected from one or more objects in the local area; and
   a controller configured to:
      detect each state of polarization (SOP) of a plurality of SOPs for each version of scattered or reflected polarized structured light pattern,
      compute an index of refraction for each object in the local area based on the detected SOPs, and
      determine at least one property of each object based on the index of refraction.

2. The DCA of claim 1, wherein the controller is further configured to:
   determine a surface normal map for the one or more objects based in part on the detected SOPs.

3. The DCA of claim 1, wherein the controller is further configured to:
   calculate Stokes reflectance parameters for the one or more objects based on the detected SOPs; and
   determine depth information for the one or more objects based on the Stokes reflectance parameters.

4. The DCA of claim 3, wherein the controller is further configured to:
   map the Stokes reflectance parameters into a set of position points for each object, each position point in the set represented by a three-dimensional coordinate and a state of polarization of light scattered or reflected from each object.

5. The DCA of claim 3, wherein the controller is further configured to:
determine, based on the Stokes reflectance parameters, a degree of polarization (DOP) map for each version of scattered or reflected polarized structured light pattern scattered or reflected from each object of the one or more objects in the local area; and
determine diffuse or specular properties of each object based on the determined DOP map.

6. The DCA of claim 1, wherein the acousto-optic device is further configured to:
directly generate the at least one structured light pattern as a circularly polarized structured light pattern based on orienting the optical beam to a crystal in the acousto-optic device in a geometry satisfying the Bragg phase matching condition.

7. The DCA of claim 1, wherein:
the polarizing element is configured to generate the plurality of polarized structured light patterns each having a different polarization;
the imaging device includes another polarizing element and a detector configured to capture portions of each differently polarized structured light pattern scattered or reflected from the one or more objects; and
the controller is further configured to:
calculate Stokes reflectance parameters based on the captured portions of the scattered or reflected differently polarized structured light patterns, and
calculate a surface normal map for the one or more objects based on the Stokes reflectance parameters.

8. The DCA of claim 1, wherein:
the imaging device includes another polarizing element and a detector configured to determine polarization components for each version of scattered or reflected polarized structured light pattern based on the detected SOPs; and
the controller is further configured to:
calculate Stokes reflectance parameters based on the determined polarization components,
calculate an index of refraction map of the one or more objects based on the Stokes reflectance parameters, and
determine properties of the one or more objects based on the calculated index of refraction map.

9. The DCA of claim 1, wherein each polarized structured light pattern of the plurality of polarized structured light patterns is selected from a group consisting of linearly polarized light, right handed circularly polarized light, left handed circularly polarized light, and elliptically polarized light.

10. The DCA of claim 1, wherein the DCA comprising the acousto-optic device, the imaging device and the controller is part of a head-mounted display (HMD).

11. The DCA of claim 1, wherein:
the controller is further configured to create emission instructions which include a radio frequency at which the acousto-optic device is driven; and
the acousto-optic device includes a transducer and a diffraction area, and responsive to the radio frequency in the emission instructions, the transducer is configured to generate a sound wave in the diffraction area to form the dynamic diffraction grating.

12. The DCA of claim 11, wherein the controller is further configured to:
modify the radio frequency to adjust at least one diffraction angle at which the optical beam is diffracted to form the at least one structured light pattern.

13. The DCA of claim 1, wherein:
the acousto-optic device is further configured to generate multiple phase shifted illumination patterns that illuminate the local area;
the imaging device is further configured to capture portions of the phase shifted illumination patterns scattered or reflected from the one or more objects in the local area; and
the controller is further configured to determine depth information for the one or more objects in the local area based at least in part on the captured portions of the scattered or reflected phase shifted illumination patterns.

14. A method comprising:
generating at least one structured light pattern from an optical beam by diffracting the optical beam using a dynamic diffraction grating;
generating, by a polarizing element rotating over a time period, a plurality of polarized structured light patterns from the at least one structured light pattern for projection into a local area, each polarized structured light pattern corresponding to a different rotational position of the polarizing element;
capturing a version of each polarized structured light pattern scattered or reflected from one or more objects in the local area;
detecting each state of polarization (SOP) of a plurality of SOPs for each version of scattered or reflected polarized structured light pattern;
computing an index of refraction for each object in the local area based on the detected SOPs; and
determining at least one property of each object based on the index of refraction.

15. The method of claim 14, further comprising:
generating multiple phase shifted illumination patterns that illuminate the local area;
capturing portions of the phase shifted illumination patterns scattered or reflected from the one or more objects in the local area; and
determining depth information for the one or more objects in the local area based at least in part on the captured portions of the scattered or reflected phase shifted illumination patterns.

16. The method of claim 14, further comprising:
calculating Stokes reflectance parameters for the one or more objects based on the detected SOPs; and
determining depth information for the one or more objects based on the Stokes reflectance parameters.

17. The method of claim 16, further comprising:
mapping the Stokes reflectance parameters into a set of position points for each object, each position point in the set represented by a three-dimensional coordinate and a state of polarization of light scattered or reflected from each object.

18. The method of claim 14, further comprising:
generating the plurality of polarized structured light patterns each having a different polarization;
capturing portions of each differently polarized structured light pattern scattered from the one or more objects;
calculating Stokes reflectance parameters based on the captured portions of the scattered or reflected differently polarized structured light patterns; and
calculating a surface normal map for the one or more objects based on the Stokes reflectance parameters.

19. The method of claim 14, further comprising:

determining polarization components for each version of scattered or reflected polarized structured light pattern based on the detected SOPs;

calculating Stokes reflectance parameters based on the determined polarization components;

calculating an index of refraction map of the one or more objects based on the Stokes reflectance parameters; and determining properties of the one or more objects based on the calculated index of refraction map.

20. The method of claim 14, further comprising:

generating emission instructions which include information about a radio frequency;

responsive to the radio frequency in the emission instructions, generating a sound wave to form the dynamic diffraction grating; and modifying the radio frequency to adjust at least one diffraction angle at which the optical beam is diffracted to form the at least one structured light pattern.

21. A head-mounted display (HMD) comprising:

an electronic display configured to emit image light;

a depth camera assembly (DCA) comprising:

an illumination source configured to emit an optical beam;

an acousto-optic device configured to function as a dynamic diffraction grating that diffracts the optical beam to form at least one structured light pattern;

a polarizing element configured to rotate over a time period to generate a plurality of polarized structured light patterns from the at least one structured light pattern for projection into a local area, each polarized structured light pattern corresponding to a different rotational position of the polarizing element;

an imaging device configured to capture a version of each polarized structured light pattern scattered or reflected from one or more objects in the local area; and a controller configured to:

detect each state of polarization (SOP) of a plurality of SOPs for each version of scattered or reflected polarized structured light pattern, compute an index of refraction for each object in the local area based on the detected SOPs, and determine at least one property of each object based on the index of refraction; and an optical assembly configured to direct the image light to an exit pupil of the HMD corresponding to a location of a user's eye.

22. The HMD of claim 21, wherein the controller is further configured to:

calculate Stokes reflectance parameters for the one or more objects based on the detected SOPs; and determine depth information for the one or more objects based on the Stokes reflectance parameters.

23. The HMD of claim 21, wherein:

the imaging device includes another polarizing element and a detector configured to determine polarization components for each version of scattered or reflected polarized structured light pattern based on the detected SOPs; and the controller is further configured to:

calculate Stokes reflectance parameters based on the determined polarization components, calculate an index of refraction map of the one or more objects based on the Stokes reflectance parameters, and determine properties of the one or more objects based on the calculated index of refraction map.

\* \* \* \* \*